US009715079B2

(12) United States Patent
Sasaki et al.

(10) Patent No.: US 9,715,079 B2
(45) Date of Patent: Jul. 25, 2017

(54) LENS DEVICE

(71) Applicant: FUJIFILM CORPORATION, Tokyo (JP)

(72) Inventors: Tadashi Sasaki, Saitama (JP); Yuji Matsuura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 333 days.

(21) Appl. No.: 14/473,012

(22) Filed: Aug. 29, 2014

(65) Prior Publication Data
US 2014/0362451 A1 Dec. 11, 2014

Related U.S. Application Data

(63) Continuation of application No. PCT/JP2012/082667, filed on Dec. 17, 2012.

(30) Foreign Application Priority Data

Feb. 29, 2012 (JP) .................................. 2012-044366

(51) Int. Cl.
*G02B 15/02* (2006.01)
*G02B 15/06* (2006.01)
(Continued)

(52) U.S. Cl.
CPC .............. *G02B 7/04* (2013.01); *G02B 7/102* (2013.01); *G03B 35/08* (2013.01);
(Continued)

(58) Field of Classification Search
CPC .......... G02B 15/10; G02B 15/06; G02B 7/04; G03B 35/08
(Continued)

(56) References Cited

U.S. PATENT DOCUMENTS 5,161,026 A * 11/1992 Mabuchi .................. G03B 7/20
348/222.1
2004/0150724 A1 * 8/2004 Nozaki .............. H04N 1/00347
348/211.4
(Continued)

FOREIGN PATENT DOCUMENTS

EP 2420888 2/2012
JP 08-307906 11/1996
(Continued)

OTHER PUBLICATIONS

Extended European search report, dated Aug. 7, 2015; Application No. 12870079.6.
PCT-ISA-237, dated Mar. 26, 2013, in corresponding application No. PCT/JP2012/082667, with partial English translation.
International Search Report PCT/JP2012/082667 dated Mar. 26, 2013.
JP Office Action dated Apr. 22, 2014, with English translation; Application No. 2014-501973.

*Primary Examiner* — Scott J Sugarman
(74) *Attorney, Agent, or Firm* — Young & Thompson

(57) ABSTRACT

A lens device (3A) is connected to a lens device (3B) to be used in association therewith. The lens device includes a setting unit (25) setting the lens device (3A) as a master, and a control unit (22) driving a control object of the lens device (3A) in response to a control signal input to the lens device (3A) and transmitting the control signal for driving the control object of the lens device (3B) to the lens device (3B) with respect to the control object for which the master has been set by the setting unit. The control unit transmits a mode switching signal which instructs to switch to a slave operating mode that is operated in response to the control signal input from the lens device (3A), to the lens device (3B), with respect to the control object for which the master has been set.

9 Claims, 8 Drawing Sheets

(51) Int. Cl.
*G02B 7/04* (2006.01)
*G03B 35/08* (2006.01)
*H04N 5/247* (2006.01)
*H04N 13/02* (2006.01)
*G02B 7/10* (2006.01)
*H04N 5/232* (2006.01)

(52) U.S. Cl.
CPC ..... *H04N 5/23203* (2013.01); *H04N 5/23245* (2013.01); *H04N 5/247* (2013.01); *H04N 13/0239* (2013.01); *H04N 13/0296* (2013.01)

(58) Field of Classification Search
USPC .................................................. 359/672–675
See application file for complete search history.

(56) References Cited

U.S. PATENT DOCUMENTS

| | | | |
|---|---|---|---|
| 2005/0041980 A1* | 2/2005 | Ueyanagi | H04B 10/1149 398/156 |
| 2006/0165405 A1 | 7/2006 | Kanai et al. | |
| 2012/0026605 A1 | 2/2012 | Kato | |

FOREIGN PATENT DOCUMENTS

| | | |
|---|---|---|
| JP | 2009-077090 | 4/2009 |
| JP | 2012-027380 | 2/2012 |

* cited by examiner

LENS DEVICE

CROSS REFEREE TO RELATED APPLICATIONS

This is a continuation of International Application No. PCT/JP2012/082667 filed on Dec. 17, 2012, and claims priority from Japanese Patent Application No. 2012-044366, filed on Feb. 29, 2012, the entire disclosures of which are incorporated herein by reference.

TECHNICAL FIELD

The present invention relates to a lens device which can be use lens system for stereoscopic photographing.

BACKGROUND ART

In stereoscopic photographing that acquires a multi-viewpoint image of a subject using a plurality of imaging devices, respective lens devices of the imaging devices preferably have the same optical condition. Thus, there is known a lens system, which is configured to render control objects changing an optical condition, such as a focus, a zoom or an iris, to be associated with each other between the lens devices (see, e.g. Patent Literatures 1 and 2).

According to Patent Literature 1, the lens system is provided with a dedicated controller which is configured to link and drive the focus or zoom of two lens devices, each of the lens devices being connected to the controller. The controller is configured to transmit an operation signal to each lens device depending on the operation quantity of the focus or zoom of an operation unit provided in the controller, thus driving each lens device under the same optical condition.

In the lens system according to Patent Literature 2, two lens devices are connected to each other, so that either of the lens devices is set as a control master for every control object, such as the focus, the zoom or the iris. Further, the controller is connected to the lens device (hereinafter, referred to as a control-master lens device) which is set as the control master, thus driving the control object.

The control-master lens device is operated in response to a control signal that is input from the controller connected to the control-master lens device. Further, the control-master lens device transmits a control signal corresponding to a set value of the control object in the control-master lens device to another lens device (hereinafter, referred to as a control-slave lens device). The control-slave lens device is operated in response to a control signal that is input from the control-master lens device.

In the lens system described in Patent Literature 2, the controller utilized when each lens device is used as a stand-alone may be converted into a controller that links and drives the two lens devices in the stereoscopic photographing.

CITATION LIST

Patent Literature

Patent Literature 1: JP-A-8-307906
Patent Literature 2: JP-A-2012-27380

SUMMARY OF INVENTION

Technical Problem

In the lens system described in Patent Literature 2, either of the lens devices is set as a master for communication between two lens devices when determining the control master/control slave (hereinafter, this lens device is referred to as a communication-master lens device, and another lens device is referred to as a communication-slave lens device).

In order to determine the control master/control slave, the setting of the control master/control slave for every control object in the communication-master lens device is prioritized regardless of whether the communication-master lens device becomes the control master or the control slave. The set information of the control master/control slave for every control object in the communication-master lens device is transmitted from the communication-master lens device to the communication-slave lens device. Further, in order to supplement the setting of the control master/control slave for every control object in the communication-master lens device, the control master/control slave is set in the communication-slave lens device.

That is, when the control slave is set for any control object in the communication-master lens device, the communication-slave lens device is set as the control master with respect to the control object.

Thus, it is assumed that all lens devices constituting the lens system described in Patent Literature 2 are the lens device which may become the control master in stereoscopic photographing. It is not considered that a conventional lens device having no function as the control master is added thereto.

Accordingly, the present invention has been made keeping in mind the above problems occurring in the related art, and the present invention is intended to propose a lens device that can constitute a lens system for stereoscopic photographing even when the conventional lens device is provided.

Solution to Problem

It is a lens device which is connected to another lens device having a slave operating mode that is operated in response to a control signal input from an external device and is used in association with said another lens device, the lens device including: a setting unit that sets the lens device as a master, with respect to at least one control object for which the lens device is associated with said another lens device; and a control unit that drives the control object of the lens device in response to the control signal input to the lens device, and transmits a control signal for driving the control object of said another lens device to said another lens device, with respect to the control object for which the master is set in the setting unit, in which the control unit transmits a mode switching signal which instructs to switch to the slave operating mode that is operated in response to the control signal input from the lens device, to said another lens device, with respect to the control object for which the master is set in the setting unit.

Advantageous Effects of Invention

According to the present invention, it is possible to constitute a lens system for stereoscopic photographing even when the conventional lens device is provided.

DESCRIPTION OF EMBODIMENTS

Figure 1:
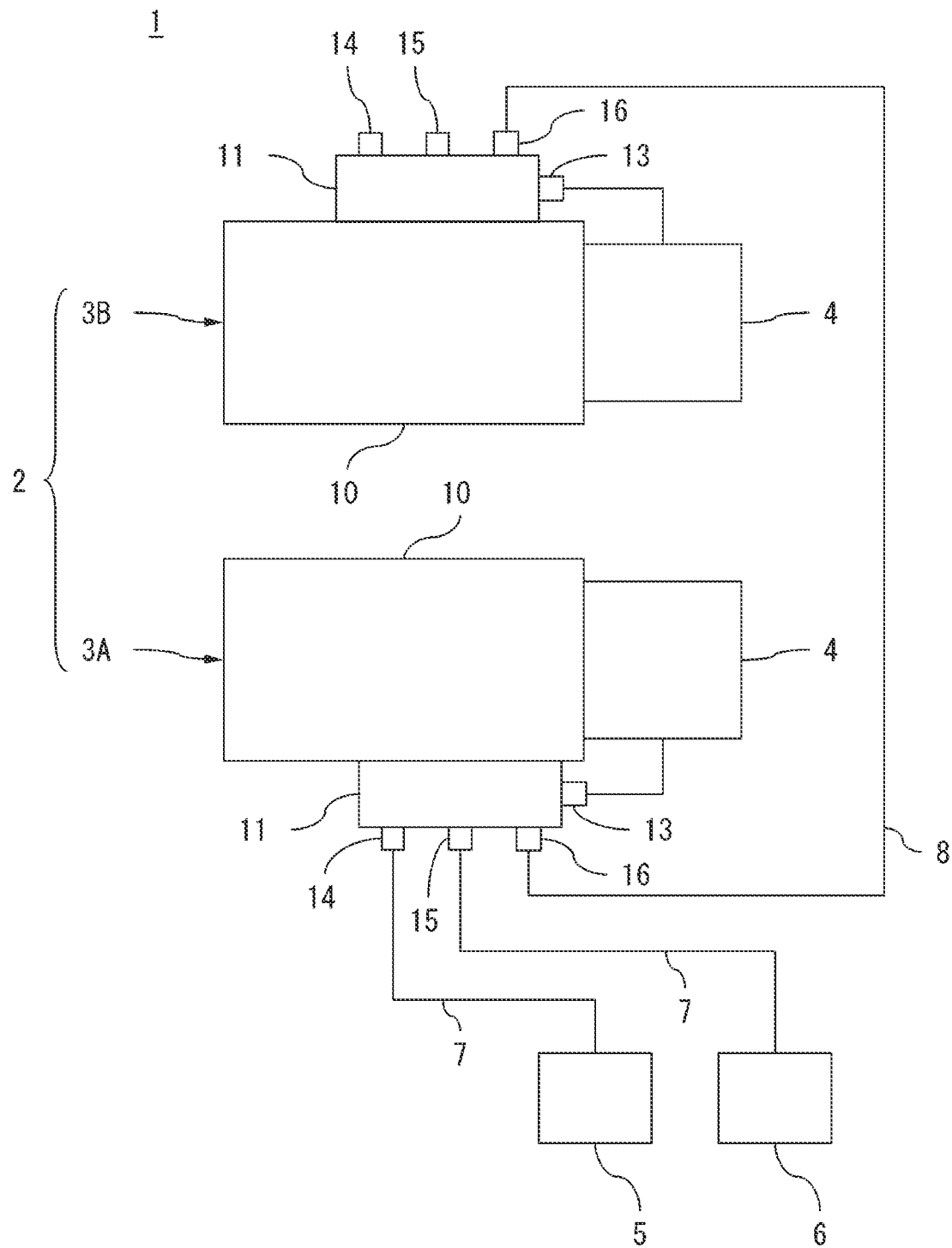
FIG. 1 is a schematic view illustrating the configuration of a stereoscopic photographing system according to an embodiment of the present invention.

FIG. 1 illustrates the configuration of a stereoscopic photographing system according to an embodiment of the present invention.

As illustrated in FIG. 1, a stereoscopic photographing system 1 is provided with a lens system 2 having two lens devices 3A and 3B, and a main body 4 of an imaging device mounted on each of the lens devices 3A and 3B. The lens system 2 further includes a focus demand 5 for driving the focus of the two lens devices 3A and 3B, and a zoom demand 6 for driving the zoom thereof.

The imaging-device main body 4 is equipped with an imaging element such as a CCD imaging element or a signal processing circuit (all are not illustrated in the drawings). The imaging-device main body 4 performs photoelectric conversion for a formed image by the lens device mounted thereon, and conducts predetermined signal processing for an obtained electric signal, thus outputting it to an external device in the form of an image signal.

All the lens devices 3A and 3B are the lens device that is usable in a stand-alone. Although the lens device 3A will be described later in detail, it is the lens device having a function for stereoscopic photographing. Meanwhile, the lens device 3B is the lens device having no function for stereoscopic photographing. Except for the function for stereoscopic photographing, the lens devices 3A and 3B typically utilize the same specification concerning the lens specification, such as the focus, the zoom or the iris.

The focus demand 5 and the zoom demand 6 are connected, via a connection cable 7, to the lens device 3A having the above-mentioned stereoscopic photographing function. The lens device 3A is connected to the lens device 3B via a connection cable 8.

Figure 2:
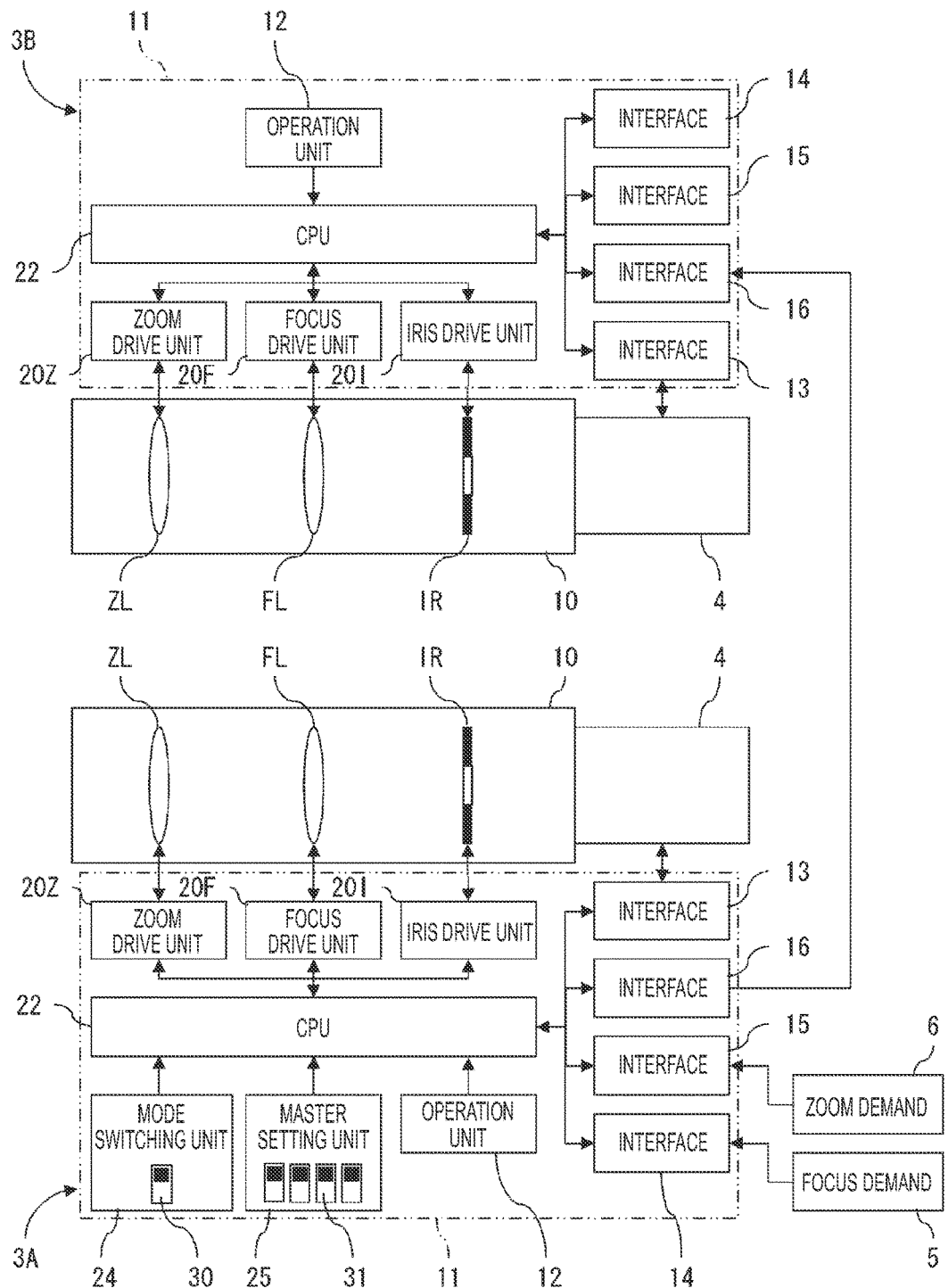
FIG. 2 is a schematic view illustrating the configuration of a lens system used in the stereoscopic photographing system of FIG. 1 and a lens device included therein.

FIG. 2 illustrates the configuration of the lens system 2 and the lens devices 3A and 3B included therein.

First, the lens device 3B having no stereoscopic photographing function will be described.

The lens device 3B is mainly composed of an imaging system, a driving system, and a control system.

The imaging system of the lens device 3B has optical elements, for example, a focus lens group FL, a zoom lens group ZL, an iris IR, etc. The films lens group FL or the zoom lens group ZL may move forwards and backwards along an optical axis. As the position of the focus lens group FL or the position of the zoom lens group ZL are regulated, the focus (a distance to a subject) is regulated or the zoom (a focal distance) is regulated. Likewise, as the position (an aperture diameter) of the iris IR is regulated, the quantity of light is regulated. These optical elements are received in a barrel 10.

The driving system of the lens device 3B has a focus drive unit 20F for moving the focus lens group FL, a zoom drive unit 20Z for moving the zoom lens group ZL, and an iris drive unit 20I for opening or closing the iris IR. Each drive unit is provided with a motor, an amplifier configured to supply power to the motor, and an encoder configured to detect the position of an element that is driven by each drive unit.

The control system of the lens device 3B has a CPU 22 configured to collectively control the operation of each unit of the lens device 3B, and a memory unit (not illustrated) configured to store a program executed by the CPU 22.

The above-described driving system and control system are provided on a drive unit 11 that is mounted to an outer circumference of the barrel 10.

The drive unit 11 is provided with an operation unit 12 including a rocker switch for driving the zoom of the lens device 3B and a VTR switch for starting/stopping the recording in the imaging-device main body 4 to which the lens device 3B is mounted. Further, the drive unit 11 is provided with an interface 13 connected to the imaging-device main body 4 when the lens device 3B is mounted to the imaging-device main body 4 and then used.

The CPU 22 transmits a recording control signal from the interface 13 to the imaging-device main body 4 by manipulating the VTR switch included in the operation unit 12. For example, in a case of using an auto-exposure control function provided in the imaging-device main body 4, an iris control signal is input from the imaging-device main body 4 to the interface 13. In a case of using an auto-focus function provided in the imaging-device main body 4, a focus control signal is input to the interface 13.

Further, the drive unit 11 is provided with an interface 14 to which the focus demand 5 for driving the focus of the lens device 3B with a manual may be connected, and an interface 15 to which the zoom demand 6 for driving the zoom of the lens device 3B separately from the rocker switch of the operation unit 12 may be connected. A focus control signal corresponding to an operation quantity in the focus demand 5 is input from the focus demand 5 to the interface 14. A zoom control signal corresponding to an operation quantity in the zoom demand 6 is input from the zoom demand 6 to the interface 15.

The drive unit 11 is provided with an interface 16 to which an external device, for example, a personal computer is connected. The external device connected to the interface 16 is used to drive the iris, focus or zoom of the lens device 3B, separately from the imaging-device main body 4, the focus demand 5, and the zoom demand 6, for example.

The lens device 3B configured as such may be utilized as the stand-alone by connecting the imaging-device main body 4 to the interface 13 and using the operation unit 12 provided in the drive unit 11, or the external device connected to the corresponding interface, such as the focus demand 5, the zoom demand 6 or the personal computer.

For example, when the lens device 3B is utilized as the stand-alone using the operation unit 12 of the drive unit 11, the iris control signal and the focus control signal are input from the imaging-device main body 4 to the lens device 3B, and the zoom control signal is input from the rocker switch of the operation unit 12 to the lens device 3B. The CPU 22 acquires the iris control signal, the focus control signal or the zoom control signal, and drives the iris drive unit 20I, the focus drive unit 20F or the zoom drive unit 20Z based on the program stored in the memory unit, thus moving the iris IR, the focus lens group FL or the zoom lens group ZL to a target position.

Further, when the focus demand 5 and the zoom demand 6 are connected to the interface 14 and the interface 15, respectively, and the lens device 3B is utilized as the stand-alone, the iris control signal is input from the imaging-device main body 4 to the lens device 3B, the focus control signal is input from the focus demand 5 to the lens device 3B, and the zoom control signal is input from the zoom demand 6 to the lens device 3B. The CPU 22 acquires the iris control signal, the focus control signal, or the zoom control signal, and drives the iris drive unit 20I, the focus drive unit 20F or the zoom drive unit 20Z based on the program stored in the memory unit, thus moving the iris IR, the focus lens group FL or the zoom lens group ZL to a target position.

When the external device such as the personal computer is connected to the interface 16 and thereby the lens device 3B is utilized as the stand-alone, the iris control signal, the focus control signal or the zoom control signal is input from the external device to the lens device 3B. The CPU 22 acquires the iris control signal, the focus control signal or the zoom control signal, and drives the iris drive unit 20I, the focus drive unit 20F or the zoom drive unit 20Z in response to the acquired control signal, based on the program stored in the memory unit, thus moving the iris IR, the focus lens group FL or the zoom lens group ZL to a target position.

A serial communication method is used, for example, for communication of the lens device 3B with another external device such as the focus demand 5, the zoom demand 6 or the imaging-device main body 4. A RS-232 or a RS-485 is used, for example, for the interface 13, 14, 15 or 16 connected to the external device.

As such, the lens device 3B may drive the zoom, for example, using the rocker switch of the operation unit 12, the zoom demand 6 connected to the interface 15, and the external device connected to the interface 16. However, in a case of using the external device connected to the interface 16 among the above-mentioned drive means, there is provided a slave operating mode, which is operated in response to the control signal input from the external device and cancels a control signal when it is input from the rocker switch or the zoom demand 6. Further, the same slave operating mode is provided to drive the focus or the iris and to instruct the recording of the imaging-device main body 4.

If a mode switching signal which instructs the switching to the slave operating mode is input from the external device for driving the zoom, the CPU 22 acquires the input mode switching signal, and performs the switching to the slave operating mode for the driving of the zoom. Subsequently, if the zoom control signal is input from the external device, the CPU 22 is operated in response to the input zoom control signal to drive the zoom.

For the driving of the zoom, a speed control having a superior response is typically used. The zoom control signal corresponding to the speed control is input from the rocker switch of the operation unit 12, the zoom demand 6 connected to the interface 15, or the external device connected to the interface 16, but it is possible to use a position control. Thus, the CPU 22 determines whether the inputted zoom control signal is obtained by the speed control or the position control, and then switches the driving control method of the zoom drive unit 20Z to the speed control or the position control, based on the determined result. Further, the position control is usually used to drive the focus or the iris.

A general configuration of the lens device 3A remains the same as the lens device 3B. Unlike the lens device 3B, the lens device 3A has, as the stereoscopic photographing function, an operating mode (also referred to as a single-component mode) used as the stand-alone, and an operating mode (hereinafter referred to as a linking mode) used in association with another lens device in stereoscopic photographing. The lens device 3A is provided with a mode switching unit 24 to perform the switching of both the operating modes.

Further, the lens device 3A is provided with a master setting unit 25 to set the lens device 3A as the master with respect to the control object, such as the focus, the zoom or the iris, which may be associated with another lens device in the linking mode.

The mode switching unit 24 is configured to include a dip switch 30. Assuming that the dip switch 30 is ON when the CPU 22 detects the state of the dip switch 30, the operating mode is set to the linking mode. In contrast, assuming that the dip switch 30 is OFF, the operating mode is set to the stand-alone mode.

As described above, in the stand-alone mode, the lens device 3A may be used as the stand-alone, by connecting the imaging-device main body 4 to the interface 13 and using the operation unit 12 provided in the drive unit 11, or the focus demand 5, the zoom demand 6, or the external device such as the personal computer, which are connected to the corresponding interfaces. In this case, the operation of the CPU 22 remains the same as the CPU 22 of the above-mentioned leas device 3B, so that a description thereof will be omitted.

In the linking mode, the lens device 3A is connected to the lens device 3B, thus associating the control object such as the focus, the zoom, the iris or a recording timing between the connected lens devices 3A and 3B. In this lens system 2, the lens device 3A and the lens device 3B are connected to each other by connecting the external device such as the personal computer to the interface 16 via a connection cable 8 (see FIG. 1).

The master setting unit 25 is configured to include the dip switch 31. If the dip switch 31 is ON when the CPU 22 detects the state of the clip switch 31, the master setting unit 25 sets it as the master. There is installed the dip switch 31 that is as many as the control object associating one lens device with another lens device in the lens device 3A. Consequently, the dip switch 31 is individually set per control object.

Since the lens system 2 includes two lens devices 3A and 3B and one lens device 3B has no stereoscopic photographing function, the lens device 3A is set as the master with respect to the control object associating the lens devices 3A and 3B in the lens system 2. Meanwhile, when the lens system is configured to include the lens device having the stereoscopic photographing function as well as the lens device 3A, another lens device may be set as the master.

With respect to the focus, the zoom, the iris, and the recording timing, the lens device 3A is set as the master, and the lens system 2 is configured such that the focus demand 5 is connected to the interface 14 of the lens device 3A, the zoom demand 6 is connected to the interface 15, and the lens device 3B is connected to the interface 16.

The CPU 22 of the lens device 3A, which is set as the master with respect to the above control object, drives the focus of the lens device 3A in response to the control signal input from the focus demand 5, drives the zoom of the lens device 3A in response to the control signal input from the zoom demand 6, and drives the iris of the lens device 3A in response to the control signal input from the imagine-device main body 4 to which the lens device 3A is mounted, thereby instructing the recording to start/stop with respect to the imaging-device main body 4 to which the lens device 3A is mounted, by manipulating the VTR switch provided in the operation unit 12 of the lens device 3A.

Further, the CPU 22 of the lens device 3A which is set as the master transmits the mode switching signal which instructs to switch to the slave operating mode that is operated in response to only the control signal transmitted from the lens device 3A with respect to the driving of the control object of the lens device 3B, from the interface 16 to the lens device 3B connected to the interface 16, and transmits the control signal for driving the control object from the interface 16 to the lens device 3B.

When the lens device 3A is not set as the master, the lens system is configured using the lens device having the stereoscopic photographing function along with the lens device 3A. When another lens device is set as the master, the operation of the lens device 3A is identical with that of the lens device 3B.

For example, with respect to the driving of the zoom, the slave operating mode is provided, which is operated in response to the control signal input from another lens device connected to the interface 16 of the lens device 3A and cancels the control signal when it is input from the rocker switch or the zoom demand 6. Likewise, with respect to the driving of the focus or the iris and the recording instruct for the imaging-device main body 4, the same slave operating mode is provided.

With respect to the driving of the zoom, if the mode switching signal which instructs to switch to the slave operating mode is input from another lens device, the CPU 22 performs the switching to the slave operating mode for the driving of the zoom. Thereafter, if the zoom control signal is input from another lens device, the CPU 22 is operated in response to the inputted zoom control signal, for the driving of the zoom.

Hereinafter, the operation of the lens system 2 will be described.

Figure 3:
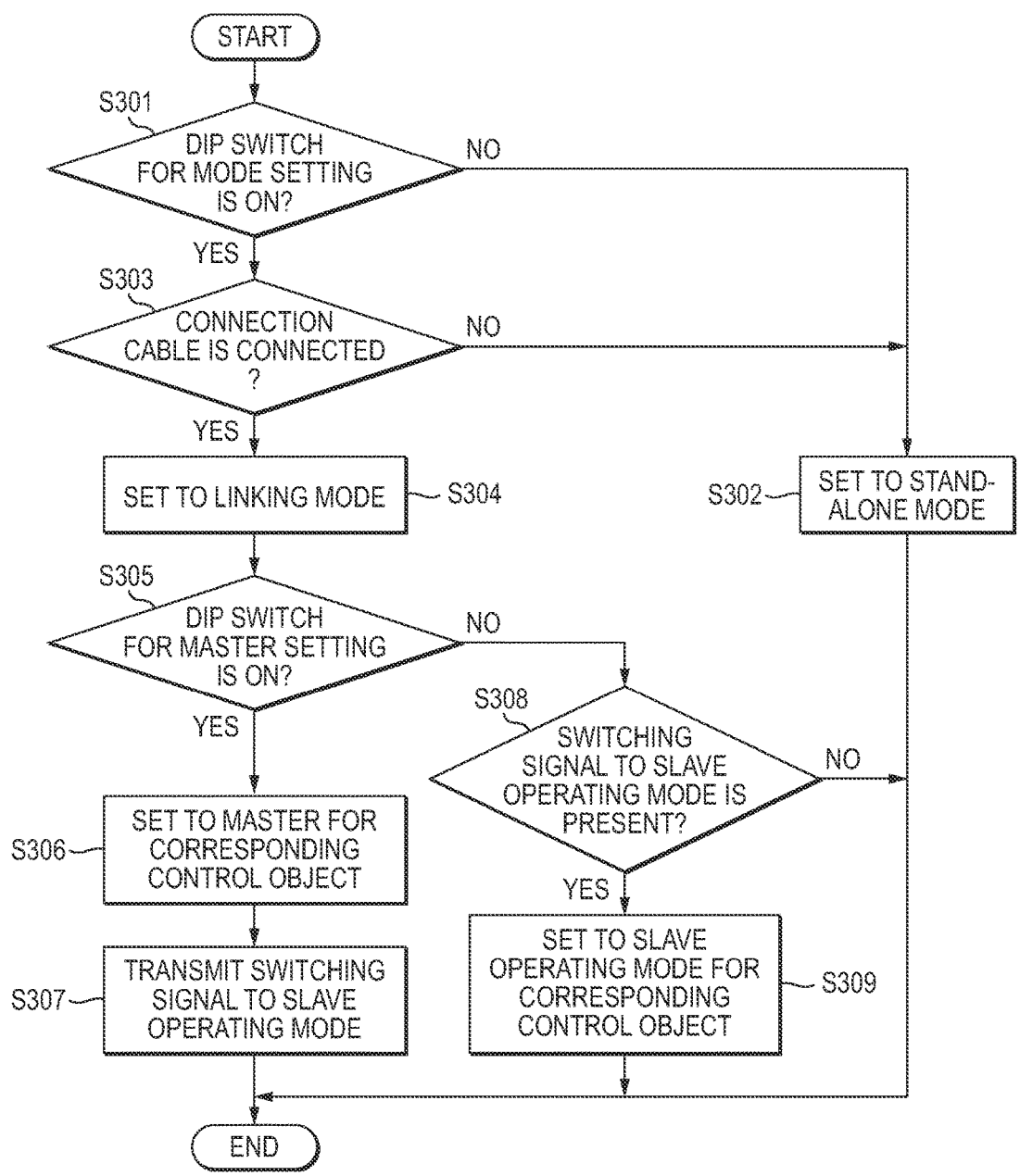
FIG. 3 is a flowchart illustrating the operation of the lens device having a function for stereoscopic photographing before the lens system of FIG. 2 is constituted.

FIG. 3 is a flowchart illustrating the operation of the lens device 3A for before the lens system 2 is constituted in stereoscopic photographing.

First, the CPU 22 of the lens device 3A detects the state of the dip switch 30 constituting the mode switching unit 24, and then sets the operating mode at step S301.

When the clip switch 30 is OFF, the CPU 22 sets the operating mode to the stand-alone mode at step S302). The lens device 3A is operated as described above when the operating mode is set to the stand-alone mode.

When the dip switch 30 is ON, the CPU 22 sets the operating mode to the linking mode. If the dip switch 30 is ON the operating mode may be immediately set to the linking mode. However, according to this example, the CPU 22 first checks the connection with the lens device 3B.

In stereoscopic photographing with the linking mode being selected, the connection cable 8 is connected to the interface 16 of the lens device 3A, and the lens device 3A and the lens device 3B are connected to each other via the connection cable 8. Thus, the CPU 22 detects whether the connection cable 8 is connected to the interface 16 at step S303.

In a case where the connection of the connection cable 8 (consequently, the connection of the lens device 3B) is not detected, the CPU 22 sets the operating mode to the stand-alone mode, regardless of the state (ON) of the dip switch 30, at step S302.

When it is detected that the connection cable 8 is connected to the interface 16, the CPU 22 sets the operating mode to the linking mode at step S304.

When the operating mode of the lens device 3A is set to the linking mode, the CPU 22 continues to detect the state of the dip switch 31 constituting the master setting unit 25, and sets the master for every control object that links the lens device 3A with another lens device at step Sf.

In a case where the dip switch 31 is ON, the CPU 22 sets the lens device 3A as the master, with respect to the driving of the control object corresponding to the dip switch 31, at step S306.

When the lens device 3A is set as the master, the CPU 22 transmits the mode switching signal for switching the operating mode of the lens device 3B connected to the interface 16 to the slave operating mode from the interface 16 to the lens device 3B, with respect to the driving of the control object for setting the lens device 3A as the master, at step S307.

In the subsequent stereoscopic photographing, the lens device 3A acts as the master in the lens system 2.

When the dip switch 31 is OFF, the CPU 22 does not set the lens device 3A as the master with respect to the driving of the control object corresponding to the dip switch 31.

When the lens device 3A is not set as the master, the CPU 22 detects the input of the mode switching signal in the interface 16 to which the lens device 3B is connected, at step S308.

In a case of detecting the input of the mode switching signal, the CPU 22 switches the operating mode to the slave operating mode with respect to the driving of the control object corresponding to the mode switching signal at step S309.

In the subsequent stereoscopic photographing, the lens device 3A is operated in response to the control signal that is transmitted from the lens device 3B connected to the interface 16 and is input into the interface 16, with respect to the driving of the control object.

Since the lens system 2 includes two lens devices 3A and 3B and one lens device 3B has no stereoscopic photographing function, the lens device 3A is set as the master with respect to every control object associating the lens devices 3A and 3B.

Figure 4:
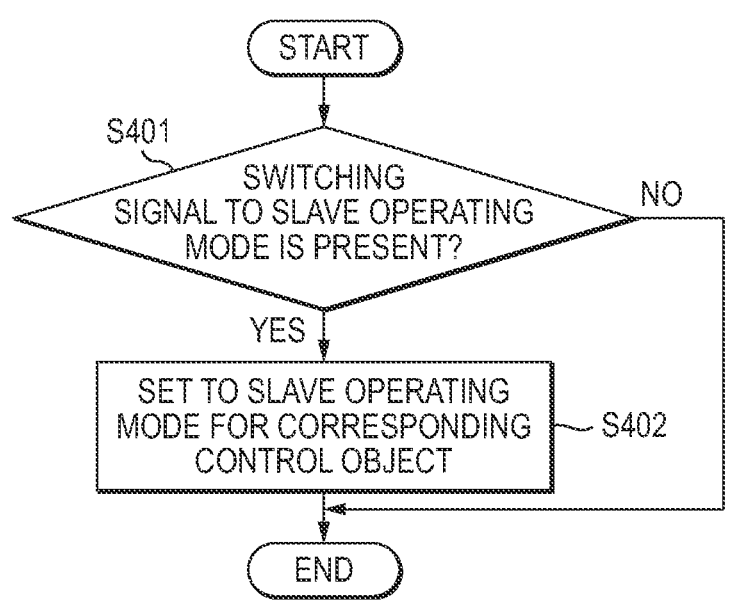
FIG. 4 is a flowchart illustrating the operation of the lens device having no function for stereoscopic photographing before the lens system of FIG. 2 is constituted.

FIG. 4 is a flowchart illustrating the operation of the lens device 3B before the lens system of FIG. 2 is constituted in stereoscopic photographing.

The CPU 22 of the lens device 3B detects the input of the mode switching signal to the interface 16 to which the lens device 3A is connected, at step S401.

In a case of detecting the input of the mode switching signal, the CPU 22 switches the operating mode to the slave operating mode, with respect to the driving of the control object corresponding to the mode switching signal at step S402.

In the subsequent stereoscopic photographing, the lens device 3B is operated in response to the control signal that is transmitted from the lens device 3A and is input to the interface 16, with respect to the driving of the control object that links the lens device 3B with the lens device 3A.

Figure 5A:
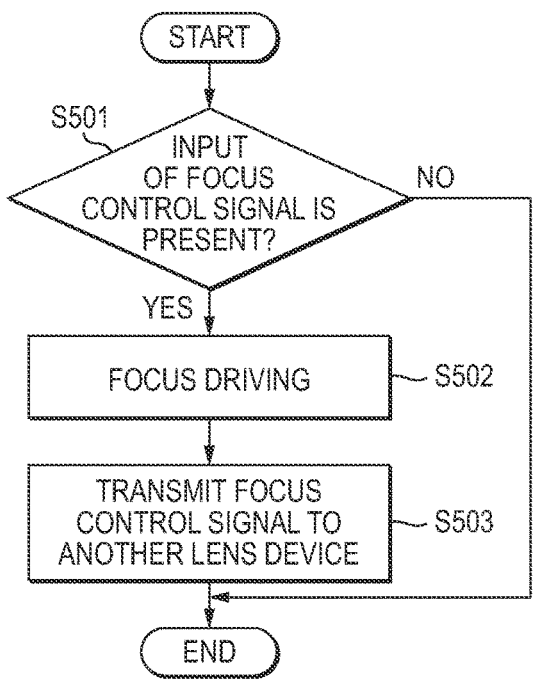
FIGS. 5A and 5B are flowcharts for illustrating the operation of each lens device in a case of associating a focus in the lens system of FIG. 2.
Figure 5B:
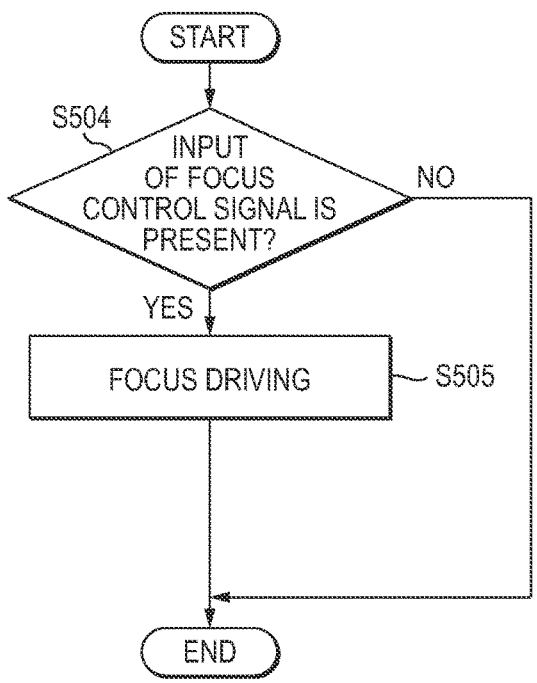

FIGS. 5A and 5B are flowcharts illustrating the operation of the lens devices 3A and 3B, respectively, in a case of associating the focus in the lens system 2.

First, the CPU 22 of the lens device 3A detects the input of the focus control signal from the focus demand 5 connected to the lens device 3A, at step S501.

In a case of detecting the input of the focus control signal, the CPU 22 drives the focus of the lens device 3A in response to the focus control signal at step S502.

Further, the CPU 22 transmits the focus control signal for driving the focus of the lens device 3B from the interface 16 to the lens device 3B so that the focus of the lens device 3B is matched with the focus of the lens device 3A, at step S503.

Except for the function for stereoscopic photographing, the lens devices 3A and 3B typically utilize the same specification concerning the lens specification, such as the focus, the zoom or the iris. Thus, the focus control signal transmitted from the lens device 3A to the lens device 3B is identical with the focus control signal for driving the focus of the lens device 3A, so that this is input from the focus demand 5 to the lens device 3A.

Meanwhile, the CPU 22 of the lens device 3B detects the input of the focus control signal from the lens device 3A at step S504.

In a case of detecting the input of the focus control signal, the CPU 22 drives the focus of the lens device 3B in response to the focus control signal at step S505.

Thereby, it is possible to obtain the state where the focus of the lens device 3B is matched with the focus of the lens device 3A.

Figure 6A:
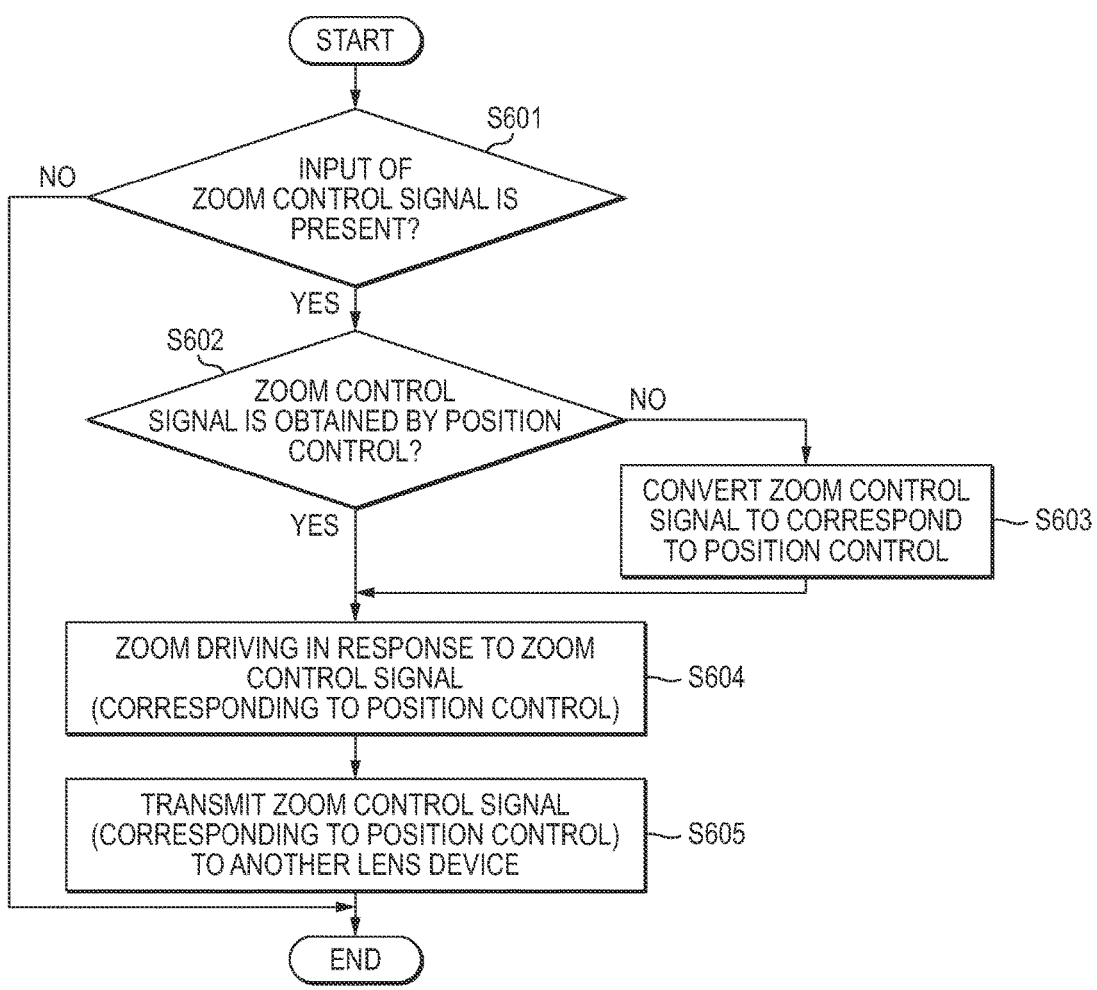
FIGS. 6A and 6B are flowcharts for illustrating the operation of each lens device in a case of associating a zoom in the lens system of FIG. 2.
Figure 6B:
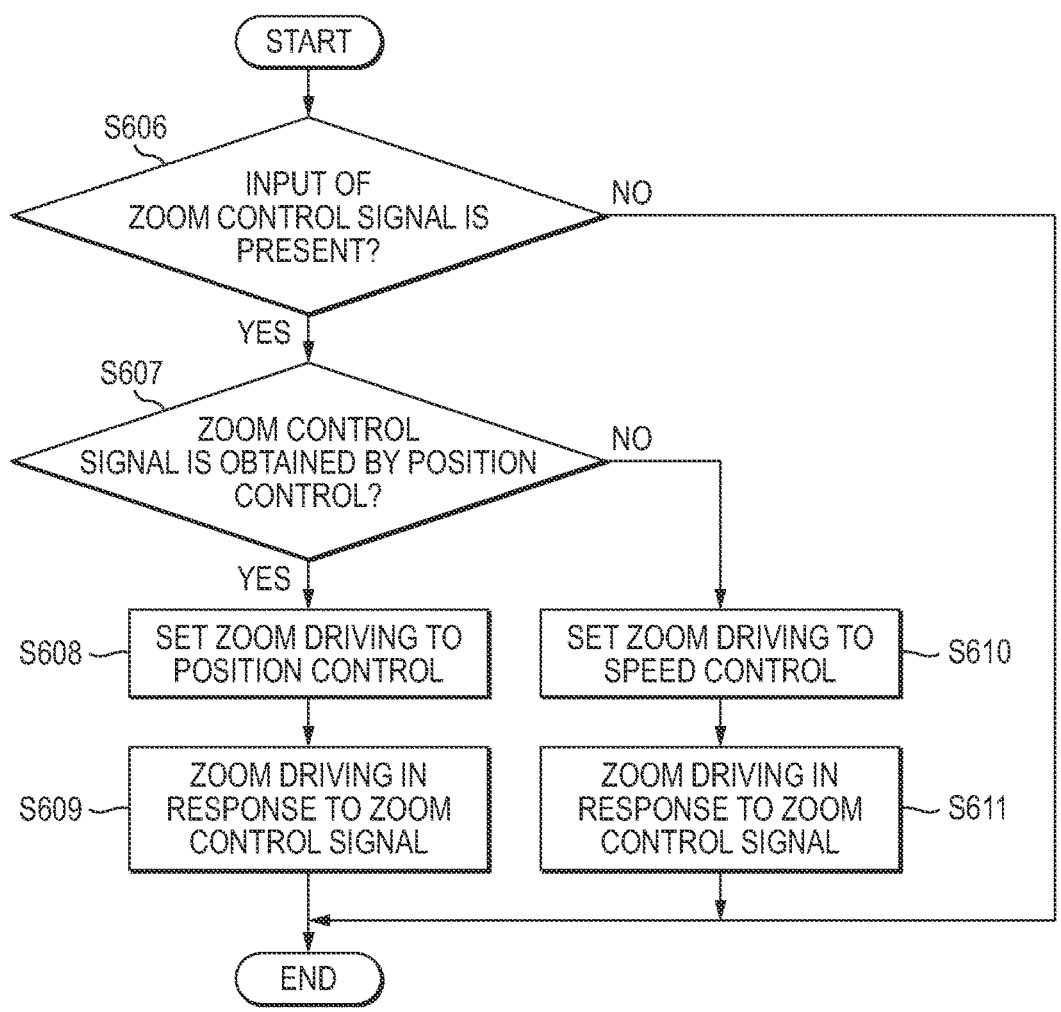

FIGS. 6A and 6B are flowcharts illustrating the operation of the lens devices 3A and 3B, respectively, in a case of associating the zoom in the lens system 2.

First, the CPU 22 of the lens device 3A detects the input of the zoom control signal from the zoom demand 6 connected to the lens device 3A, at step S601.

In a case of detecting the input of the zoom control signal, the CPU 22 determines whether the zoom control signal is obtained by the speed control or the position control at step S602.

When it is determined that the zoom control signal is obtained by the speed control, the CPU 22 converts it into the zoom control signal corresponding to the position control by integral at step S603, and drives the zoom of the lens device 3A in response to the converted zoom control signal obtained by the position control at step S604.

When it is determined that the zoom control signal is obtained by the position control, the CPU 22 drives the zoom of the lens device 3A in response to the inputted zoom control signal at step S604.

Further, the CPU 22 transmits the zoom control signal for driving the zoom of the lens device 3B so that the zoom of the lens device 3B is matched with the zoom of the lens device 3A, from the interface 16 to the lens device 3B at step S605.

The zoom control signal transmitted from the lens device 3A to the lens device 3B becomes the zoom control signal converted to correspond to the position control when the zoom control signal input from the zoom demand 6 to the lens device 3A is obtained by the speed control, and besides, becomes the inputted zoom control signal when the zoom control signal input from the zoom demand 6 to the lens device 3A is obtained by the position control.

Meanwhile, the CPU 22 of the lens device 3B detects the input of the zoom control signal from the lens device 3A at step S606.

In a case of detecting the input of the zoom control signal, the CPU 22 determines whether the zoom control signal is obtained by the speed control or the position control at step S607.

In this case, since the zoom control signal is the position control signal, the CPU 22 switches the driving control method of the zoom drive unit 20Z to the position control at step S608, and then drives the zoom in response to the inputted zoom control signal at step S609.

Further, when the zoom control signal is the speed control signal, the CPU 22 switches the driving control method of the zoom drive unit 20Z to the speed control at step S610, and then drives the zoom in response to the inputted zoom control signal at step S611.

When the lens devices 3A and 3B are used as the stand-alone, the speed control is typically used for the zoom. But, when the zoom is associated between both the lens devices 3A and 3B, it is possible to drive the zoom of both the lens devices 3A and 3B without a mismatch by the position control as described above.

For the operation of the lens devices 3A and 3B when the iris is associated, the driving of the iris in the lens devices 3A and 3B is the position control similarly to the driving of the focus. This is similar to the case of associating the focus except that the iris control signal is input from the imaging-device main body 4 equipped with the lens device 3A to the lens device 3A.

Figure 7A:
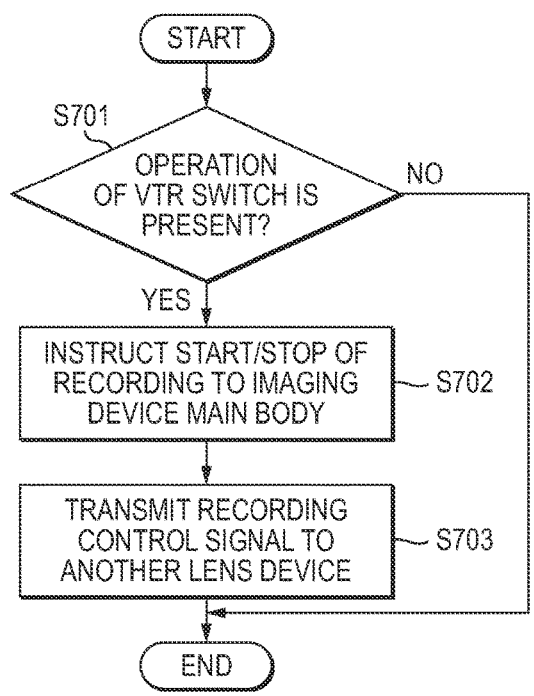
FIGS. 7A and 7B are flowcharts for illustrating the operation of each lens device in a case of associating a VTR switch in the lens system of FIG. 2.
Figure 7B:
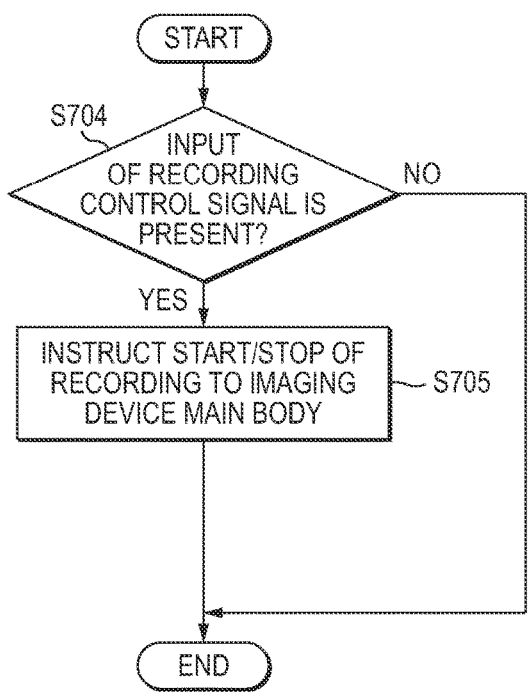

FIGS. 7A and 7B are flowcharts illustrating the operation of the lens devices 3A and 3B, respectively, in a case of associating the VTR switch in the lens system 2.

First, the CPU 22 of the lens device 3A detects the operation of the VTR switch provided on the operation unit 12 of the lens device 3A at step S701.

In a case of detecting the operation of the VTR switch, the CPU 22 instructs the start/stop of the recording for the imaging-device main body 4 equipped with the lens device 3A depending on the operation, at step S702.

The CPU 22 transmits a recording control signal for matching the start/stop of the recording in the imaging-device main body 4 equipped with the lens device 3B with the start/stop of the recording in the imaging-device main body 4 equipped with the lens device 3A from the interface 16 to the lens device 3B at step S703.

The CPU 22 of the lens device 3B detects the input of the recording control signal from the lens device 3A at step S704.

In a case of detecting the input of the recording control signal, the CPU 22 instructs the start/stop of the recording for the imaging-device main body 4 equipped with the lens device 3B in response to the recording control signal at step S705.

Thus it is possible to obtain a state where the start/stop of the recording is synchronized in both imaging-device main bodies 4.

In the operation of the lens devices 3A and 3B of the lens system 2, the lens device 3A having the stereoscopic photographing function instructs the lens device 3B to operate in response to the control signal transmitted from the lens device 3A with respect to the driving of the control object for which the master setting is achieved, only in a case where the lens device 3A itself is set as the master in stereoscopic photographing.

For example, when the lens device 3A is set as the master with respect to the focus, the zoom, and the recording timing and is not set as the master with respect to the iris, the lens system 2 is configured such that, with respect to the iris, the iris control signal by the auto-exposure control function is input from the imaging-device main body 4 equipped with each lens device 3A or 3B to the lens device, and the iris is driven in response to the inputted iris control signal in each lens device 3A or 3B.

Therefore, unlike the related art, it is possible to utilize the lens device 3B having no functions as the master, with respect to the control object that may link the lens device 3A having the stereoscopic photographing function with another lens device, this constituting the lens system 2 along with the lens device 3A.

Further, the dip switch 31, which is as many as the control object for associating the lens device 3A with another lens device, is provided on the master setting unit 25 of the lens device 3A, and the master is individually set per control object. However, unlike such a configuration, it is possible to perform the master setting for every control object with one dip switch 31. In comparison with a case where the master is set per control object, the setting can be easily performed and the setting leakage of the master can be eliminated. Moreover, in a case of constituting the lens system using the lens device having the stereoscopic photographing function along with the lens device 3A, it is possible to reduce the possibility that the lens device 3A and another lens device compete for the setting of the master.

Although it has been described that the master setting in the lens device 3A is performed by the dip switch 31, the following configuration is possible: the lens device 3A may be connected to the focus demand 5 or the zoom demand 6 and thereby the lens device 3A may be set as the master, with respect to the driving of the focus or zoom, for example. That is, the CPU 22 of the lens device 3A detects the connection of the focus demand 5 to the interface 14, and sets the lens device 3A as the master for the driving of the focus in a case of detecting the connection. Similarly, the CPU 22 may detect the connection of the zoom demand 6 to the interface 15 and set the lens device 3A as the master for the driving of the zoom in a case of the connection. In this case, either of the focus demand 5 or the zoom demand 6 may be connected to the lens device 3A, and the master may be integrally set for every control object that may link the lens device 3A with another lens device.

As described above, the following aspects are disclosed in this specification.

(1) It is a lens device which is connected to another lens device having a slave operating mode that is operated in response to a control signal input from an external device and is used in association with said another lens device, the lens device including: a setting unit that sets the lens device as a master, with respect to at least one control object for which the lens device is associated with said another lens device; and a control unit that drives the control object of the lens device in response to the control signal input to the lens device, and transmits a control signal for driving the control object of said another lens device to said another lens device, with respect to the control object for which the master is set in the setting unit, in which the control unit transmits a mode switching signal which instructs to switch to the slave operating mode that is operated in response to the control signal input from the lens device, to said another lens device, with respect to the control object for which the master is set in the setting unit.

(2) It the lens device of (1), in which the setting unit is a switch provided on the lens device.

(3) It is the lens device of (1), further including: a detecting unit that detects the external device for operating the control object for which the lens device is associated with said another lens device is connected to the lens device, in which the setting unit sets the lens device as the master, with respect to the control object controlled by at least the external device, when the detecting unit detects the connection of the external device.

(4) It is the lens device of any one of (1) to (3), in which a plurality of control objects for which the lens device is associated with said another lens device is provided, and the setting unit collectively sets the lens device as the master with respect to all of the control objects.

(5) It is the lens device of any one of (1) to (4), in which the lens device includes a first operating mode used as a stand-alone and a second operating mode used in association with said another lens device, and a mode switching unit that switches between the first operating mode and the second operating mode.

(6) It is the lens device of (5), in which the control object for which the lens device is associated with said another lens device includes a zoom, in the first operation mode, the control unit drives the zoom of the lens device by speed control, and in the second operation mode, when the master is set for the zoom, the control unit drives the zoom of the lens device by position control and transmits to said another lens device, the control signal for driving the zoom of said another lens device by the position control, and when the master is not set for the zoom, the control unit drives the zoom based on the control signal input to the lens device.

(7) It is the lens device of any one of (1) to (6), in which the lens device includes a slave operating mode which is operated in response to the control signal input from said another lens device, and the control unit cancels the control signal other than the control signal input from said another lens device, among the control signal input to the lens device, in a case where the mode switching signal which instructs to switch to the slave operating mode is input front said another lens device, with respect to the control object for which the master is not set.

INDUSTRIAL APPLICABILITY

According to the present invention, it is possible to constitute a lens system for stereoscopic photographing even when the conventional lens device is provided.

Although the present invention has been described in detail with reference to specific embodiments, it is to be appreciated that those skilled in the art can change or modify the embodiments without departing from the scope and spirit of the present invention.

This application claims the priority of Japanese Patent Application (Japanese Application No. 2012-044366) filed on Feb. 29, 2012, the disclosure of which is incorporated herein by reference.

REFERENCE SIGNS LIST 1 stereoscopic photographing system
2 lens system
3A lens device
3B lens device
4 main body of imaging device
5 focus demand
6 zoom demand
10 barrel
11 drive unit
12 operation unit
20F focus drive unit
20I iris drive unit
20Z zoom drive unit
23 memory unit
24 mode switching unit
25 master setting unit
30 dip switch
31 dip switch
FL focus lens group
ZL zoom lens group
IR iris

The invention claimed is:

1. A lens device which is connected to another lens device having an operating mode used as a stand-alone mode and a slave operating mode that is operated in response to a control signal input from an external device and is used in association with said another lens device, the lens device comprising:
   a setting unit that sets the lens device as a master, with respect to at least one control object for which the lens device is associated with said another lens device; and
   a control unit that drives the control object of the lens device in response to the control signal input to the lens device, and transmits a control signal for driving the control object of said another lens device to said another lens device, with respect to the control object for which the master is set in the setting unit,
   wherein the control unit transmits, to said another lens device, a mode switching signal only with respect to the control object for which the master is set in the setting unit, to instruct to said another lens device to switch the operation mode with respect to the control object from the operation mode used as the stand-alone mode to the slave operation mode that is operated in response to the control signal input by the lens device.

2. The lens device of claim 1, wherein the setting unit is a switch provided on the lens device.

3. The lens device of claim 1, further comprising:
   a detecting unit that detects the external device for operating the control object for which the lens device is associated with said another lens device is connected to the lens device,
   wherein the setting unit sets the lens device as the master, with respect to the control object controlled by at least the external device, when the detecting unit detects the connection of the external device.

4. The lens device of claim 1, wherein a plurality of control objects for which the lens device is associated with said another lens device is provided, and
   the setting unit collectively sets the lens device as the master with respect to all of the control objects.

5. The lens device of claim 1, wherein the lens device includes
   a first operating mode used as the stand-alone mode and a second operating mode used in association with said another lens device, and
   a mode switching unit that switches between the first operating mode and the second operating mode.

6. The lens device of claim 5, wherein the control object for which the lens device is associated with said another lens device includes a zoom,
   in the first operation mode, the control unit drives the zoom of the lens device by speed control, and
   in the second operation mode, when the master is set for the zoom, the control unit drives the zoom of the lens device by position control and transmits to said another lens device, the control signal for driving the zoom of said another lens device by the position control, and when the master is not set for the zoom, the control unit drives the zoom based on the control signal input to the lens device.

7. The lens device of claim 1, wherein the slave operating mode is operated in response to the control signal input from said another lens device, and
   the control unit cancels the control signal other than the control signal input from said another lens device, among the control signal input to the lens device, in a case where the mode switching signal which instructs to switch to the slave operating mode is input from said another lens device, with respect to the control object for which the master is not set.

8. The lens device of claim 1, wherein the lens device further includes a dip switch, and when the dip switch is off, the operating mode is set to the stand-alone mode.

9. The lens device of claim 8, wherein the lens device is connected to said another lens device with a cable, and when a connection between the lens device and said another lens device is not detected, the operating mode is set to the stand-alone mode regardless of the state of the dip switch.

* * * * *